United States Patent [15] 3,647,940

Harwood [45] Mar. 7, 1972

[54] CONTROL SYSTEM

[72] Inventor: Leopold A. Harwood, 800 Summit Ridge Drive, Somerville, N.J. 08876

[22] Filed: Dec. 1, 1970

[21] Appl. No.: 93,992

Related U.S. Application Data

[63] Continuation-in-part of Ser. No. 733,640, May 31, 1968.

[52] U.S. Cl. ..........................178/5.4 R, 307/238, 307/251, 307/296, 307/304

[51] Int. Cl. ..........................H03k 25/02

[58] Field of Search ..........................307/205, 238, 251, 279, 296, 307/297, 304, 316; 328/125, 126, 82, 84, 210; 315/84.5; 330/38 FE; 178/5.4 R, 5.4 AC, 5.8 R

[56] References Cited

UNITED STATES PATENTS

| | | | |
|---|---|---|---|
| 2,828,447 | 3/1958 | Mauchly | 328/125 X |
| 2,901,641 | 8/1959 | Wolf | 315/84.5 X |
| 3,079,560 | 2/1963 | Richards | 307/316 X |
| 3,361,082 | 1/1968 | Leslie | 307/252 X |
| 3,373,295 | 3/1968 | Lambert | 307/238 |
| 3,438,189 | 4/1969 | Gasser et al. | 307/304 X |
| 3,461,325 | 8/1969 | Barrett | 307/251 X |
| 3,463,993 | 8/1969 | Beck et al. | 307/238 X |
| 3,482,167 | 12/1969 | Kaplan et al. | 307/304 X |
| 3,575,612 | 4/1971 | Lunn | 307/238 |

OTHER PUBLICATIONS

Steele et al., Analog Output for Direct Digital Control, IBM Technical Disclosure Bulletin, Nov. 1965, pp. 912 & 913.

Beck, J. W., Analog Storage Circuit, IBM Technical Disclosure Bulletin, Dec. 1966, pp. 916 & 917.

*Primary Examiner*—Stanley T. Krawczewicz
*Attorney*—Eugene M. Whitacre

[57] ABSTRACT

A semiconductor device has a first and a second electrode interconnected with circuit means to form an electric circuit operable to control functions in an electric apparatus by changes in the conductivity of the first-second electrode current path. The device control electrode, which exhibits a high-input impedance, is coupled by a capacitor to a source cause potential. The capacitor is additionally connected to a source of control voltage adapted to change the charge state of the capacitor. A discharge path is provided for the capacitor and includes a switch to reset the voltage at the control electrode of the device to control the device first-second electrode current path conductivity such that the controlled function is adjusted to a predetermined condition.

A plurality of circuits may be provided to control a plurality of functions in an apparatus. In such case, means are included for simultaneously actuating the switch means associated with each of the plurality of circuits so that the conductivity of the first-second electrode current path of the devices are simultaneously brought to reference levels which case the controlled functions to be simultaneously adjusted to predetermined conditions.

21 Claims, 3 Drawing Figures

INVENTOR
LEOPOLD A. HARWOOD

BY Eugene M. Whitacre

ATTORNEY

INVENTOR
Leopold A. Harwood
BY Eugene M. Whitacre
ATTORNEY

CONTROL SYSTEM

The present invention is a continuation-in-part of the patent application Ser. No. 733,640, filed in the name of Leopold A. Harwood on May 31, 1968, and entitled, "CONTROL SYSTEM."

The present invention pertains to control systems, and more particularly, to a control system utilizing field effect transistors (FET) for controlling various functions in electronic apparatus.

The use of field-effect transistors in conjunction with a storage capacitor associated with the gate electrode of the device as a memory or control unit is known. For example, a thesis prepared by T. D. Martin entitled "Circuit Applications of the Field-Effect Transistor," deposited with the University of Pennsylvania library in April 1960, and later published as an article in Semiconductor Products in February 1962, pages 33 to 39, discloses the use of a field-effect transistor as an analog memory. The basic concept is to charge the capacitor associated with the FET control electrode to a set level and due to the high input impedance of FET devices, the charge remains on the capacitor and establishes a level of conductivity in the device. Nevertheless, due to leakage of the stored charge on the capacitor over a period of time, there is a change in level of the conductivity of the device because of change in voltage at the control electrode. If, under these conditions, the control system is operated, the system may begin to operate with the controlled function far from its normal operating range. It is therefore desirable to be able to preset the level of conductivity in the device so that the controlled function will remain within its normal operating range. Moreover, once present conditions have been established for the device, it is also desirable to be able to reset the level of conductivity to the preset condition after the system has been in operation.

An electric circuit embodying the present invention includes a semiconductor device having a first and a second electrode interconnected with circuit means to form an electric circuit operable to control functions in an electric apparatus by changes in the conductivity of the first-second electrode current path of the device. The device additionally includes a control electrode exhibiting a high input impedance. A capacitor is coupled to the control electrode of the device and also to a source of potential and a source of control voltage. A discharge path is provided for the capacitor and includes switch means to reset the voltage at the control electrode of the device to control the device first-second electrode current path conductivity such that the controlled function is adjusted to a predetermined condition.

In accordance with a feature of the present invention, a plurality of the above-described circuits are provided to control a plurality of functions in the electric apparatus. Means are included for simultaneously actuating the switch means associated with each of the plurality of circuits such that the conductivity of the first-second electrode current path of the devices are simultaneously brought to reference levels which cause the controlled functions to be simultaneously adjusted to predetermined conditions.

A complete understanding of the invention may be obtained from the following detailed description of a specific embodiment thereof, when taken in conjunction with the accompanying drawings, in which.

Figures 1, 2:
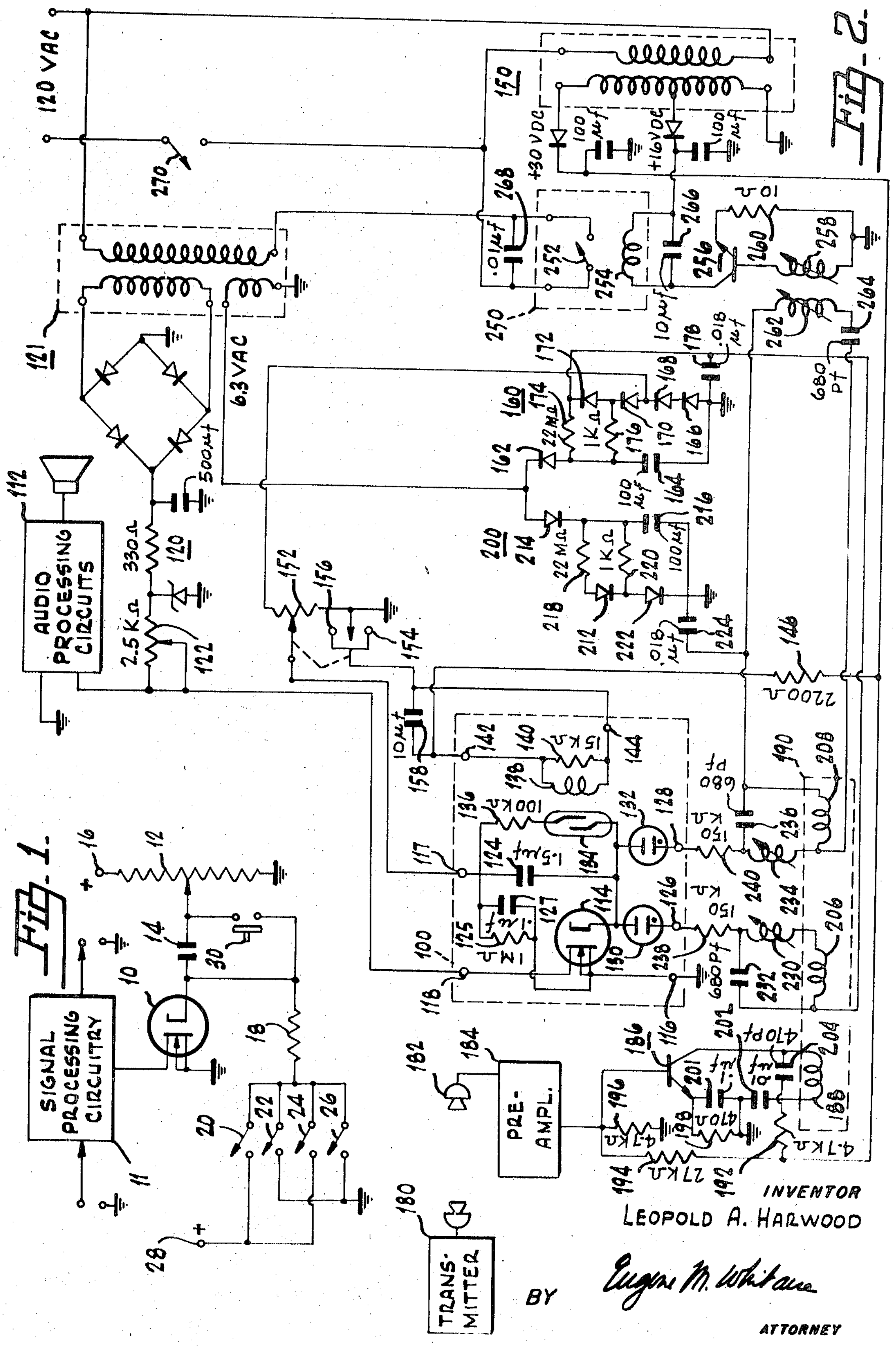
FIG. 1 is a schematic circuit diagram of a control system embodying the present invention.
FIG. 2 is a schematic circuit diagram of a control system embodying the present invention and adapted for use with a ratio receiver.

Referring now to FIG. 1, a field-effect transistor 10 which may be of the metal oxide semiconductor (MOS) type controls signal processing circuit 11. For example the transistor

10 may be an N channel enhancement device which has a high source-drain resistance for zero gate-to-source voltage and a decreasing source-drain resistance as the gate is made positive relative to the source. Control is achieved by varying the conductivity of the drain-to-source electrode path of the transistor 10. By way of example, the transistor 10 is shown as a variable shunt attenuator for the signal processing circuitry 11, but may also be used as a series attenuator. Typical functions which may be controlled by the transistor 10 are the audio, color and tint signal processing circuitry of a television receiver. The gate electrode of the transistor 10 is coupled to the slide of a resistor 12 by a capacitor 14. The resistor 12 is connected between a terminal 16, adapted to be energized by a source of potential and ground.

The gate side of the capacitor 14 is connected by a resistor 18 to a series of switches 20, 22, 24 and 26. The switches 20 and 24, when closed, connect the gate electrode of the transistor 10 through the resistor 18 to a terminal 28 which is adapted to be energized by a source of control voltage. The switches 22 and 26, when closed, connect the gate electrode of the transistor 10 through the resistor 18 to the ground. The switches 20 and 22 may be positioned adjacent the apparatus for local control thereof, while the remaining switches 24 and 26 may be positioned remote from the apparatus to be controlled, or alternatively positioned locally and arranged for control from a remote location.

The setting of the slide on the variable resistor 12 establishes a reference, or preset, condition for the gate electrode of the transistor 10. This adjustment is made so that the signal processing circuitry 12 is adjusted to be within its normal operating range.

The present of the gate electrode enables the signal processing circuitry to remain within its normal operating range even after a charge setting on the capacitor 14, as hereinafter described, leaks off after a period of time. Adjustment of the signal processing circuitry within its operating range is achieved by changing the voltage at the gate electrode of the transistor 10 through the use of the switches 20, 22, 24 and 26. By connecting the capacitor to the source of control voltage at terminal 28 or to ground, charge may be added or subtracted from the capacitor 14. This adjustment of charge on the capacitor changes the voltage at the gate electrode of the transistor 10 and, thus, the conductivity of the drain to source electrode path.

After the system has been in operation and charge has been added or subtracted from the capacitor 14, it may be desirable to reset the level of conductivity of the drain to source electrode path of the transistor 10 to the preset conditions determined by the slide adjustment on the variable resistor 12. This is achieved by a discharge path for the capacitor 14 which includes the switch 30. B closing the switch 30, the capacitor is discharged and, when the switch is opened, the voltage at the gate electrode of transistor 10 will be reset to the voltage at the slider of resistor 12.

Referring now to FIG. 2, an FET control module 100 controls the audio signal processing circuitry 112 of a television receiver. It is to be understood that the FET control module 100 may be adapted to control other signal processing circuitry, and may for example, be use in the color and tint control circuitry of the receiver.

The module 100, which is an encapsulated unit to prevent a deterioration of the module components due to environmental conditions, includes a metal oxide semiconductor (MOS) type insulated gate field-effect transistor 14. In this case the transistor 114 is an "N" channel depletion device. Such a device exhibits moderate source-to-drain resistance for zero gate to source bias voltage, and increasing source-to-drain resistance as the gate is made negative relative to the source, but decreasing resistance as the gate is made positive relative to the source. The source and substrate electrodes of the transistor 114 are connected to ground through a module terminal 116. The drain electrode of the transistor 114 is connected by way of the module terminal 118 and a variable resistor 122 to a source of operating potential 120. The takeoff point to the audio processing circuitry 112 is at the junction of the resistor 122 and the module terminal 118.

A storage capacitor 124 is connected from the gate electrode of the transistor 114 through a module terminal 117 to manual adjustment circuitry including a resistor 152 with a slider. The manual adjustment circuitry permits the establishment of a voltage at terminal 117 which, in conjunction with the voltage on the storage capacitor 124, produces a voltage between the gate electrode and the source electrode of the transistor 114. This establishes a conductivity level in the device or, put another way, establishes the impedance of the source to drain electrode path which is utilized to control the audio processing circuitry 112. It will be understood that the audio circuits receive an appropriate audio signal, from a source not shown, and the transistor 114 is shown as a shunt attenuator at some appropriate point in the audio channel.

The gate electrode of the transistor 114 is also connected to two module terminals 126 and 128 by two neon switching tubes 130 and 132, respectively. These neon tubes connect the storage capacitor 124 to remote control circuitry of a type to be hereinafter described. A reed switch 134 in series with a resistor 136 is connected in parallel with the storage capacitor 124 to provide, when the reed switch contacts are closed, a discharge path for the storage capacitor 124. The reed switch is actuated by energization of the parallel combination of a winding 138 and a resistor 140 which is connected between two module terminals 142 and 144. The terminal 142 is connected by a resistor 146 to a source of potential derived from a transformer diode arrangement 150. The connection to terminal 144 is described below.

A resistor 125 and a capacitor 127 are connected in parallel between the module terminal 117 and the source and substrate electrodes and provide a protective circuit for the transistor 114 when it is not a part of the system. This protective circuit insures that a static charge will not build up which may destroy the device. In addition, the capacitor 127 acts as an AC bypass to ground for the tap of the adjustable resistor 152 of the manual adjustment circuitry, to which the module terminal 117 is connected.

Manual adjustment of the gate to source potential of the field-effect transistor 114 and, hence, the conductivity level of the device 114 is achieved by an adjustment of the tap on the variable resistor 152. Movement of the tap on the resistor 152 results in a ganged movement of contacts 154 and 156 which are connected to ground while manual adjustments are made. The contacts 154 and 156 are connected to the module terminal 144 and, hence, their closing results in an energization of the winding 138 and consequently, a closing of the reed contacts of the switch 134. This causes the storage capacitor 124 to discharge through resistor 136, such that when the reed switch opens upon completion of the manual adjustment, the input voltage (gate to source) of transistor 114 is equal to the voltage provided at the slider of the adjustable resistor 152. The reed switch 134 thus provides a means for resetting the input voltage of transistor 114 to a desired reference level. A capacitor 158 connected between the module terminals 142 and 144 slows down the rate of collapse of the magnetic field associated with the winding 138 when the contacts 154 and 156 are open to prevent damage to the transistor 114.

The adjustable resistor 152 is connected to a source of negative control voltage 160. The source of negative control voltage includes a diode 162 and capacitor 164 serially connected between a secondary winding on a transformer 121 and ground, transformer 121 being supplied with AC line voltage. Four serially connected diodes 166, 168, 170 and 172 are connected between ground and a resistor 174 which interconnects the cathode electrode of the diode 172 and the anode electrode of the diode 162. A resistor 176 interconnects the anode of the diode 172 and the anode of the diode 162. A capacitor 178 connected in parallel with the four serially connected diodes, bypasses AC signals to ground. The top end of the adjustable resistor 152 of the manual adjustment circuitry is connected at the junction of the diodes 168 and 170, as shown, and hence, to a voltage twice the diode anode-cathode voltage drop above ground—typically twice 0.7 volts, or a total of 1.4 volts for silicon diodes. Since the bottom end of the variable resistor 152 is connected to ground, the slide on the resistor 152 can establish at the module terminal 117 any voltage between 0 and −1.4 volts.

The control system can also be operated from a remote transmitter 180 which transmits any one of a series of predetermined signals. These transmitted signals are picked up by a microphone 182 and amplified in a preamplifier 184. The signals are then coupled to the base electrode of a transistor 186 which is the active device of a driver stage to energize the primary winding 188 of a transformer 190. Operating power for the collector electrode of the transistor 186 is provided through the winding 188 and a resistor 192 which couples the primary winding 188 to the source of operating potential 150. Two serially connected resistors 194 and 196 coupled across the source 150 provide at their junction the bias potential for the base electrode of the transistor 186. Parallel connected resistor 198 and capacitor 201 couple the emitter electrode of the transistor 186 to ground. A capacitor 202 connected between the junction of resistor 192 with the winding 188 and ground provides an AC bypass for the resistor 192. Capacitor 204 tunes the winding 188 of the transformer 190 to the received control signal frequency band.

The transformer 190 also includes two secondary windings 206 and 208. The winding 206 is connected by its left-hand terminal to the source of negative control voltage 160 at the cathode electrode of the diode 172 while the secondary 208 is connected by its right-hand terminal to the anode electrode of a diode 212 associated with a source of positive control voltage 200.

The source 200 includes a diode 214 and a capacitor 216 serially connected between the aforementioned secondary winding of the transformer 121 and ground. The cathode electrode of the diode 214 is connected to the anode electrode of the diode 212 by a resistor 218. The cathode of the diode 212 is connected to the junction of a resistor 220 and the anode electrode of a diode 222, which are serially connected between the cathode electrode of the diode 214 and ground. A capacitor 224 is connected across the diodes 212 and 222 to provide an AC bypass to ground.

Each of the secondary windings 206 and 208 are additionally connected with a capacitor and a variable inductor, the inductor being adjusted to series resonate with its associated capacitor at different frequencies. The winding 206 drives an adjustable inductor 230 and a capacitor 232, while the secondary winding 208 drives an adjustable inductor 234 and a capacitor 236. When the primary winding 188 of the transformer 190 is energized by an appropriate signal from transmitter 180, the corresponding one of the series tuned circuits (that is, one of the circuits including the inductor 230 and capacitor 232 or the inductor 234 and capacitor 236) which is resonant at the transmitted frequency will develop a substantially sinusoidal voltage having a relatively high peak to peak value (for example 200 volts) at the junction of its inductor and capacitor. This AC voltage is applied to the corresponding one of neon switching tubes 130, 132 by a corresponding one of resistors 238 and 240. The resistor 238 couples the junction of the units 230 and 232 to module terminal 126, and the resistor 240 couples the junction of the units 234 and 236 to module terminal 128.

The peak value of the AC voltage applied to the appropriate neon switching tube 130, or 132 exceeds the ionizing voltage of that tube and, furthermore, is at a frequency (for example in the typical television receiver remote control frequency range of 34 to 45 kHz.) sufficiently high that ionization (activation) of the neon tube is maintained continuously. The ionized neon tube connects its associated source (160 or 200) of relatively low unidirectional control voltage to capacitor 124.

If the transmitted signal is at the resonant frequency of the inductor 230-capacitor 232 combination, the neon tube switch 130 will be activated and will permit the flow of direct current between the storage capacitor 124 and the source of negative control voltage 160. The path is from the junction of the resistor 174 and diode 172 through the secondary transformer winding 206, the variable inductor 230, the resistor 238, and the neon tube 130 to the storage capacitor 124. In a like manner, should the transmitted signal be at the resonant frequency of the variable inductor 234-capacitor 236 arrangement, the neon tube switch 132 would be actuated and the storage capacitor 124 would be connected for direct current flow to the source of positive control voltage 200. In this case, the path would be from the junction of the resistor 218 and the diode 212 through the secondary transformer winding 208, the adjustable inductor 234, the resistor 240, and the neon tube 132 to the storage capacitor 124. By selectively actuating the neon tube switches 130 and 132, charge may either be added to or subtracted from the storage capacitor 124. This results in an adjustable setting, by remote control action, of the voltage on the gate electrode of the field-effect transistor 114. Once the proper amount of charge is supplied to the storage capacitor 124, the operating neon switch is open circuited by removing the transmitted signals. The storage capacitor 124 will then be disconnected from the source of control potential 200 or 160 which was employed in adjusting its charge.

The rate of charging of the storage capacitor 124 is determined by the value of the resistor 174 for the source of negative control potential 160 and by the value of the resistor 218 for the source of positive control potential 200. These resistors are selected such that the rate of change of the charge on the storage capacitor 124 is relatively slow. The diode arrangements in the potential sources 160 and 200 limit the voltage to which the storage capacitor 124 may be charged and confines the charging to a linear portion of the exponential charge curve. By making the change of charge gradual and linear, accurate remote control adjustment is enhanced.

Since the input impedance of the gate electrode of the transistor 114 is extremely high, the charge on the storage capacitor 124 leaks off at an extremely slow rate (for example, with a time constant in the order of weeks). The voltage level at the gate electrode of the transistor 114 is thereby maintained and the resultant conductivity level of the device stabilized. It is important that the charge on the storage capacitor 124 not be permitted to leak off, else the voltage at the gate electrode of the device would change to produce a change in the control of the audio processing circuitry 112. To insure against charge leakage, the module 100 is encapsulated. It is also desired that there be no leakage of charge through the switching means which connects and disconnects the storage capacitor to the source of control potential employed. The neon tube switches 130 and 132, because of the high leakage resistance associated with their off condition, provide the desired low charge leakage.

It should be noted that the manual control afforded by variable resistor 152 permits adjustment of a quiescent or initial voltage to transistor 114 with the range between zero and −1.4 volts, while by virtue of the remote control of the charge on capacitor 124, the operating input voltage of transistor 114 may be adjusted within the wider range of +0.7 volts to −2.1 volts. This latter operating range is set by the voltage supplies 60 and 100 and is selected to accommodate any variations in the neon tube switches 130 and 132.

When the system (audio processing circuitry 11) is not in operation, means are provided for disconnecting the primary winding of the transformer 121 from its source of power and, hence, inactivating the source of operating potential 120 for the transistor 114. This means may include a switch 252 which is connected in series with the primary winding of the transformer 121. A winding 254 is also included and is adapted to actuate the switch when energized. The winding 254 interconnects the collector electrode of a transistor 256 and the source of operating potential 150. The base electrode of the transistor 256 is connected to ground by a variable inductor 258 and the emitter electrode of the transistor is connected to ground by a resistor 260. An adjustable inductor 262 is coupled to the winding 258 and is serially connected with a capacitor 264 between the left and right-hand terminal of the secondary winding 208 of transformer 190. The transformer action between the inductors 262 and 258 isolates the direct current voltages associated with the transistor 256 from the module charging circuits.

The above-mentioned adjustable inductor 262 and capacitor 264 are adjusted to be series resonant at a desired frequency different from the control frequencies mentioned previously. When the transmitter transmits signals at this frequency, the transistor 256 is rendered conductive and current flows in its collector to emitter path. The resulting current flows through the winding 254 then opens or closes the relay switch 252, depending on the switch's previous state. A capacitor 266 is connected across the winding 254. A capacitor 268 is connected across the switch of the relay to prevent arcing and the generation of undesired radiofrequency signals. A master switch 270 is provided for completely turning off the system. Normally, the switch 270 is closed and the source of operating potential 150 is energized to permit remote turn on of the system.

It should be noted that several module 100 arrangements may be used with the windings 206 and 208 by utilizing a parallel arrangement of these modules with the windings 206 and 208. However, the series connected inductor and capacitor associated with each module must be resonant at a different frequency. In this manner, additional functions can be added to the receiver, for example, tint and color control.

Figure 3:
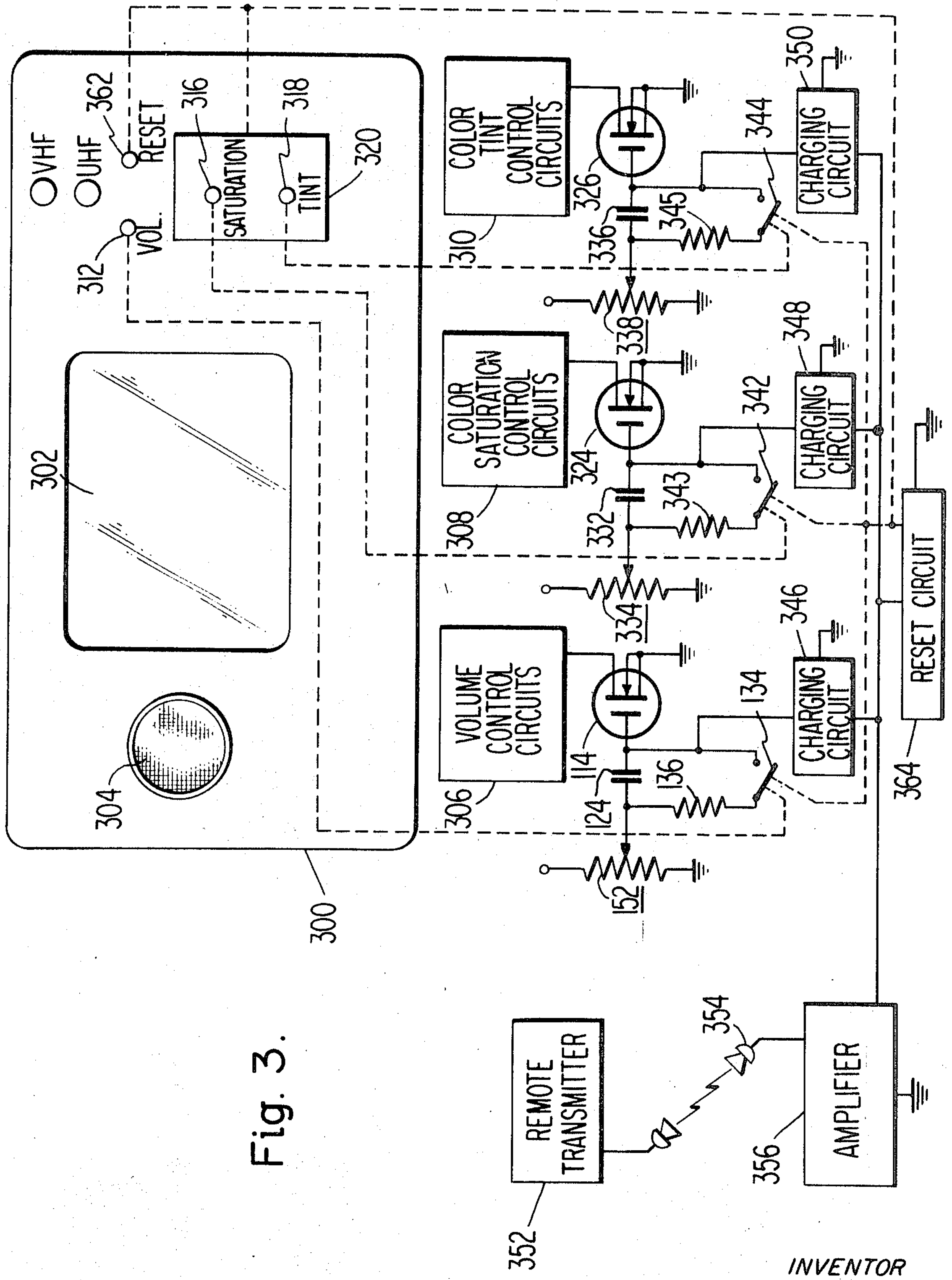
FIG. 3 is a schematic circuit diagram, partly in block form, of a control system embodying the present invention and adapted to control a plurality of functions in a television receiver.

Referring now to FIG. 3 wherein similar reference numerals are used to designate similar circuit components shown in FIG. 2, a television receiver 300 includes a kinescope 302 and a speaker 304. The television receiver is of the type having circuits which control the volume of the reproduced sound and the saturation and tint of the colors viewable on the face of the kinescope 302. Shown in block form are volume control circuits 306, color saturation control circuits 308, and color tint control circuits 310. The volume control circuit 306 is manually adjustable by a manual volume control 312 on the television receiver. Similarly, the saturation and tint of the colors viewable on the face of the kinescope are manually adjustable by a manual color saturation control 316 and a manual color tint control 318, respectively. The manual color saturation control 316 and manual color tint control 318 are hidden controls which are housed within an openable enclosure 320 on the receiver 300.

The volume control circuit 306, the color saturation control circuit 308 and the color tint control circuit 310 each include a field-effect transistor connected in such a manner that changes in the conductivity of the source-drain electrode current path controls the particular function involved. Thus, a field-effect transistor 114 has its source-drain electrode current path coupled between the volume control circuits 306 and ground, while a field-effect transistor 324 and a field-effect transistor 326 are each connected, respectively, with the color saturation control circuit 308 and the color tint control circuit 310 with their source-drain electrode current path coupled between the control circuit and ground. The substrate electrode of each of the transistors 114, 324 and 326 is connected to ground.

Each of the field-effect transistors has a charging capacitor connected between its gate electrode and the slider of an adjustable resistor. The resistor is coupled between a source of potential and ground. A capacitor 124 is coupled between the gate electrode of the transistor 114 and the slider of an adjustable resistor 136; a capacitor 332 is coupled between the gate electrode of the transistor 324 and the slider of an adjustable resistor 334; and a capacitor 336 is coupled between the gate electrode of the transistor 326 and the slider of an adjustable resistor 338.

Whenever an adjustable resistor slider is reset, a switch coupled between the ends of the capacitor is closed. A switch 134 and a resistor 136 are coupled across the charging capacitor 124. The switch 134 is ganged to the slider of the adjustable resistor 152. A switch 342 and a resistor 343 are coupled across the charging capacitor 332, and a switch 344 and a resistor 345 are coupled across the charging capacitor 336. These switches are ganged to the respective sliders of the adjustable resistors to which they are connected. Each of the switches is ganged in such a manner that movement of the adjustable resistor slider causes the switch to close.

Adjustment of the television receiver manual controls results in a movement of the slider of the particular adjustable resistor coupled to the control. Consequently, when the volume control 312 is adjusted, the slider of adjustable resistor 152 is moved, and the adjustment of the color saturation control 316 or the color tint control 318 similarly causes movement of the sliders of the adjustable resistors 334 and 338. Movement of the slider of the adjustable resistors closes the switch ganged to the slider and establishes a reference or preset voltage for the gate electrode of the particular field-effect transistor involved. This in turn establishes a reference conductivity for the source-drain electrode current path of the transistor and, hence, establishes a predetermined condition for the function involved.

Three charging circuits 346, 348, and 350 are coupled to the charging capacitors 124, 332 and 336, respectively. These circuits may be similar to the charging circuit shown in FIG. 2 coupled to charging capacitor 124. Each of the charging circuits is operable to change the charge on the capacitor to which it is coupled and thereby change the conductivity of the source-drain electrode current path of the field-effect transistor associated with the particular capacitor. In this manner, by adding or subtracting charge on the storage capacitor, the volume of the reproduced sound and the saturation and tint of the colors viewable on the face of the television receiver kinescope may be adjusted.

As is common in remote controlled television receivers, the volume control circuit, the color saturation control circuit, and the color tint control circuit may be adjusted by means of the remote transmission of signals of a predetermined frequency from a remote transmitter 352. The remote transmitter 352 functions to generate distinct frequency signals, associated with adding charge to and subtracting charge from each of the charging capacitors 124, 332 and 336. When a signal is transmitted by transmitter 352, it is detected by a transducer 354 and applied to an amplifier 356 which amplifies signals falling within the frequency range of those transmitted by the remote transmitter 352. The amplifier 356 is connected to each of the charging circuits 346, 348 and 350 which include frequency selective filters. The filters, two of which are associated with each charging circuit, permit only the particular frequency signals to actuate the charging circuit to add or subtract charge on the charging capacitor. Thus, each charging circuit can be independently, remotely actuated by either of two signals of differing frequency. One of the signals is associated with adding charge on the capacitor while the other is associated with subtracting charge from the capacitor.

After continued use of the remote transmitter 352 wherein charge is selectively and independently added to or subtracted from the capacitors 124, 332 and 336, it may be desirable to simultaneously bring the conductivity of the source-drain electrode current path of the field-effect transistors 114, 324 and 326, back to their reference levels. In this manner, the volume of the reproduced sound, and the saturation and tint of the colors viewable on the face of the kinescope are reset to the condition determined by the resistor slider setting. Thus, the switches 134, 342 and 344 are ganged for unicontrol. Ganged or simultaneous operation of the switches 134, 342 and 344 may be achieved either by the remote transmission of a reset signal of predetermined frequency, the operation of a reset control 362 on the television receiver 300, or by the opening of the openable enclosure 320 in order to gain access to the manual color saturation control 316 and the manual color tint control 318.

When the remote transmitter 352 transmits the reset signal, it is detected by the transducer 354 and amplified in the amplifier 356 to be thereafter applied to a reset circuit 364 which is only responsive (by means of a frequency selective filter) to the frequency of the reset signal. The reset signal actuates the reset circuit 364 to cause a momentary ganged operation or closing of the switches 134, 342 and 344. When the switches close, the charging capacitors across which they are coupled are discharged and the voltage for the gate electrodes of the transistors are reset to the reference level determined by the resistor slider setting. Consequently, the volume of the reproduced sound and the saturation and tint of the color reproduced on the face of the kinescope are simultaneously reset. The reset control 362 and the opening of the openable enclosure 320 also function to simultaneously operate or close the ganged switches 134, 342 and 344 and thereby reset the television receiver controlled functions.

In view of the above, it will be recognized that after repeat remote adjustments of the several functions, a user can simultaneously reset all the functions to a predetermined condition by the manipulation of a single control. This single control can be positioned on the television receiver, as is reset control 362, or on the remote transmitter 352. Moreover, when a user desires to readjust the predetermined conditions for the saturation and tint of the colors viewable on the face of the kinescope, the mere act of gaining access to the controls simultaneously resets the controlled functions. This insures that the readjustment, which is usually achieved by visually inspecting the reproduced picture, is not affected by the previous charge condition of the charging capacitors.

What is claimed is:

1. A control circuit comprising:

an insulated gate field-effect transistor having a gate electrode, a source electrode and a drain electrode, said source and drain electrodes interconnected with circuit means to form an electrical circuit operable to control functions in an electric apparatus by changes in the conductivity of the source-drain electrode current path of the transistor;

a charging capacitor connected between said gate electrode and said source electrode;

a source of reference potential;

means including a first switch for connecting said source of reference potential between said gate and source electrode when said switch is closed; and a charging circuit including a second switch for changing the charge on said capacitor when said second switch is closed to control the source to drain conductivity of said transistor such that the controlled function is adjusted to a desired condition.

2. A control circuit as defined in claim 1 including means for adjusting said reference potential to establish a predetermined gate to source reference potential when said first switch is closed.

3. The combination comprising:

a semiconductor device having a first electrode, a second electrode and a control electrode exhibiting a high input impedance, with the first and second electrodes interconnected with circuit means to form an electrical circuit operable to control functions in an electric apparatus by changes in the conductivity of the first-second electrode current path of said device;

a capacitor connected to the control electrode of said device;

a source of reference potential;

means for coupling said source of reference potential to said capacitor;

a source of control voltage;

means for coupling said source of control voltage to said capacitor; and a discharge path for said capacitor including switch means for resetting the control electrode of said device to said reference potential to control the first-second electrode current path conductivity of said device such that the controlled function is adjusted to a predetermined condition.

4. The combination as defined in claim 3 wherein said semiconductor device is a field-effect transistor.

5. The combination comprising:

a field-effect transistor having a source electrode, a drain electrode and a gate electrode, said source and drain electrode interconnected with circuit means to form an electrical circuit operable to control functions in an electric apparatus by changes in the conductivity of the source-drain electrode current path of said transistor;

a source of reference potential;

a capacitor having a first end and a second end, said first end connected to said gate electrode of said transistor;

adjustable means coupled to said source of reference potential and the second end of said capacitor for controlling the amplitude of the reference potential applied to said second end;

a source of control voltage; and means for coupling said source of control voltage to the first end of said capacitor.

6. The combination comprising:

a field-effect transistor having a source electrode, a drain electrode and a gate electrode, with said source and drain electrode being interconnected to provide an electrical circuit;

a source of reference potential;

a capacitor having a first end and a second end, said first end connected to said gate electrode of said transistor and said second end connected to said source of reference potential;

means for controlling the amplitude of the reference potential applied to said second end;

a source of control voltage;

means for coupling said source of control voltage to the first end of said capacitor; and a discharge path coupling the first and second ends of said capacitor and including switch means for resetting the gate electrode of said transistor to said reference potential.

7. The combination as defined in claim 6 wherein said field-effect transistor is of the insulated gate variety.

8. The combination as defined in claim 6 wherein said electrical circuit is operable to control functions in an electric apparatus by changes in the conductivity of the source-drain electrode current path of said transistor and said switch means b resetting the gate electrode of said transistor to said reference potential controls the source-drain electrode current path conductivity of said transistor such that the controlled function is adjusted to a predetermined condition.

9. The combination as defined in claim 8 wherein said field-effect transistor is of the insulated gate variety.

10. In an apparatus of the type including circuits adapted to control a plurality of functions of said apparatus, a control circuit comprising:

a plurality of semiconductor devices each including a first electrode, a second electrode and a control electrode exhibiting a high input impedance;

a plurality of charging capacitors, each charging capacitor having a first and a second end with the first end coupled to the control electrode of one of said plurality of devices;

means for operably connecting the first-second electrodes of each of said plurality of devices with said apparatus circuits such that the conductivity of the first-second electrode current path of each of said plurality of devices controls a given function in said apparatus;

circuit means coupling a source of potential to the second end of each of said plurality of charging capacitors;

a plurality of switch means, each of said plurality of switch means connected in a circuit coupled between the first and second ends of one of said plurality of charging capacitors; and means for simultaneously actuating said switch means such that the conductivity of said first-second electrode current path of each of said plurality of devices is brought to a reference level to cause each controlled function to be adjusted to a predetermined condition.

11. A control circuit as defined in claim 10 wherein said means for simultaneously actuating is operable by a control positioned on said apparatus.

12. A control circuit as defined in claim 10 wherein said means for simultaneously actuating is operable by means responsive to a remotely generated signal.

13. A control circuit as defined in claim 10 wherein said means for simultaneously actuating is operable by a control positioned on said apparatus and by means responsive to a remotely generated signal.

14. A control circuit as defined in claim 13 wherein each of said plurality of devices is a field effect transistor whose source, drain and gate electrodes correspond respectively to said device first, second and control electrodes.

15. In a television receiver of the type having circuits to control the volume of the reproduced sound and the saturation of the color viewable on the face of the television receiver kinescope, a control circuit comprising:

a first and a second field-effect transistor, each transistor having a gate electrode, a source electrode and a drain electrode;

the source and drain electrodes of said first transistor operably connected with said receiver circuits such that the conductivity of said first transistor source-drain electrode current path controls the volume of the reproduced sound;

the source and drain electrodes of said second transistor operable connected with said receiver circuits such that the conductivity of said second transistor source-drain electrode current path controls the saturation of the colors viewable on the face of the television receiver kinescope;

a first and a second charging capacitor each having a first and a second end, each of said charging capacitors coupled to one of said first and said second transistor so that each transistor includes a charging capacitor coupled to its gate electrode;

circuit means coupling a source of potential to the second end of each of said first and said second charging capacitors;

a first and a second switch means, each of said switch means connected in a circuit coupled between the first and second ends of one of said first and said second charging capacitors;

charging means coupled to said first and said second charging capacitors for independently changing the charge on said capacitors to independently control the conductivity of the source-drain electrode current path of each of said first and said second transistors such that the volume of the reproduced sound and the saturation of the colors viewable on the face of the television receiver kinescope may be adjusted to desired conditions; and means for simultaneously actuating said first and said second switch means such that the conductivity of the source-drain electrode current path of each of said first and said second transistors is brought to a reference level to cause the volume of the reproduced sound and the saturation of the colors viewable on the face of the television receiver kinescope to be adjusted to a predetermined condition.

16. A control circuit as defined in claim 15 wherein said means for simultaneously actuating is operable by a control positioned on said television receiver.

17 A control circuit as defined in claim 15 wherein said means for simultaneously actuating is operable by means responsive to a remotely generated signal.

18. A control circuit as defined in claim 15 wherein said means for simultaneously actuating is operable by a control positioned on the television receiver and by means responsive to a remotely generated signal.

19. A control circuit as defined in claim 15 wherein said charging means is responsive to four distinct remotely generated signals, two of which function to selectively cause said charging means to add charge to one of said first and said second capacitors and the other two of which function to selectively cause said charging means to subtract charge from one of said first and said second capacitors, and wherein said means for simultaneously actuating is operable by means responsive to a fifth distinct remotely generated signal.

20. In a television receiver of the type having circuits to control the volume of the reproduced sound and saturation and tint of the color viewable on the face of the television receiver kinescope, a control circuit comprising:

a first, a second and a third field-effect transistor, each transistor having a gate electrode, a source electrode and a drain electrode;

the source and drain electrodes of said first transistor operably connected with said receiver circuits such that the conductivity of said first transistor source-drain electrode current path controls the volume of the reproduced sound;

the source and drain electrodes of said second transistor operably connected with said receiver circuits such that the conductivity of said second transistor source-drain electrode current path controls the saturation of the colors viewable on the face of the television receiver kinescope;

the source and drain electrodes of said third transistor operably connected with said receiver circuits such that the conductivity of said third transistor source-drain electrode current path controls the tint of the color viewable on the face of the television receiver kinescope;

a first, a second and a third charging capacitor each having a first and a second end, each of said charging capacitors coupled to one of said first, said second and said third transistors so that each transistor includes a charging capacitor coupled to its gate electrode;

circuit means coupling a source of potential to the second end of each of said first, said second and said third charging capacitors;

a first, a second and a third switch means, each of said switch means connected in a circuit coupled between the first and second ends of one of said first, said second and said third charging capacitors;

charging means coupled to said first, said second and said third charging capacitors for independently changing the charge on said capacitors to independently control the conductivity of the source-drain electrode current path of each of said first, said second and said third transistors such that the volume of the reproduced sound and the saturation and tint of the colors viewable on the face of the television receiver kinescope may be adjusted to desired conditions; and means for simultaneously actuating said first, said second and said third switch means that the conductivity of the source-drain electrode current path of each of said first, said second and said third transistors is brought to a reference level to cause the volume of the reproduced sound and the saturation and tint of the colors viewable on the face of the television receiver kinescope to be adjusted to a predetermined condition.

21. A control circuit as defined in claim 20 wherein said television receiver includes a manually operated control for adjusting at least one of the volume of the reproduced sound, and the saturation and tint of the colors viewable on the face of the television receiver kinescope housed within an openable enclosure, and said means for simultaneously actuating operate by means responsive to the opening of said enclosure.

* * * * *

UNITED STATES PATENT OFFICE
CERTIFICATE OF CORRECTION

Patent No. 3,647,940 Dated March 7, 1972

Inventor(s) Leopold A. Harwood

It is certified that error appears in the above-identified patent and that said Letters Patent are hereby corrected as shown below:

In the Abstract, line 6, delete "cause" and insert -- of -- In Column 1, line 68, delete "ratio" and insert -- radio --. Column 2, line 33, delete "present" and insert -- preset --; line 52, delete "B" and insert -- By --; line 60, delete "use" and insert -- used --. Column 9, line 53, delete "b" and insert -- by --.

Signed and sealed this 26th day of December 1972.

(SEAL)
Attest:

EDWARD M.FLETCHER,JR.
Attesting Officer

ROBERT GOTTSCHALK
Commissioner of Patents

FORM PO-1050 (10-69)
3530 6|72

USCOMM-DC 60376-P69
U.S. GOVERNMENT PRINTING OFFICE 1969 O-366-334